United States Patent
Faerber et al.

(10) Patent No.: US 8,462,845 B2
(45) Date of Patent: Jun. 11, 2013

(54) ENCODING PARAMETER DETERMINATION FOR A HYBRID ENCODING SCHEME

(75) Inventors: Nikolaus Faerber, Erlangen (DE); Herbert Thoma, Erlangen (DE)

(73) Assignee: Franhofer-Gesellschaft zur Ferderung der angewandten Forschung e. V., Munich (DE)

( * ) Notice: Subject to any disclaimer, the term of this patent is extended or adjusted under 35 U.S.C. 154(b) by 1458 days.

(21) Appl. No.: 12/065,532

(22) PCT Filed: Aug. 25, 2006

(86) PCT No.: PCT/EP2006/008371
§ 371 (c)(1),
(2), (4) Date: Mar. 18, 2008

(87) PCT Pub. No.: WO2007/028515
PCT Pub. Date: Mar. 15, 2007

(65) Prior Publication Data
US 2008/0232466 A1    Sep. 25, 2008

(30) Foreign Application Priority Data
Sep. 5, 2005  (DE) .................. 10 2005 042 134

(51) Int. Cl.
| H04B 1/66 | (2006.01) |
| H04B 14/04 | (2006.01) |
| H04N 11/02 | (2006.01) |
| H04N 11/04 | (2006.01) |
| H04N 7/32 | (2006.01) |
| H04N 7/34 | (2006.01) |
| H04N 7/36 | (2006.01) |

(52) U.S. Cl.
CPC .. H04N 7/32 (2013.01); H04N 7/34 (2013.01); H04N 7/36 (2013.01)
USPC ................................ 375/240.03; 375/240.23

(58) Field of Classification Search
None
See application file for complete search history.

(56) References Cited

U.S. PATENT DOCUMENTS
6,167,162 A * 12/2000 Jacquin et al. ............... 382/251
7,257,157 B2    8/2007 Cheung
2003/0086495 A1    5/2003 Cheung FOREIGN PATENT DOCUMENTS
JP    6-261302 A    9/1994
JP    2003-125406 A    4/2003

OTHER PUBLICATIONS

N. Farber, H. Mohammed, H. Toma, Rate-Distortion Optimized Multipass Video Encoding with Application to MPEG-4, IEEE International Conference on Image Processing, Sep. 14, 2005, pp. 866-869.*

(Continued)

*Primary Examiner* — John Blanton
*Assistant Examiner* — Christopher Crutchfield
(74) *Attorney, Agent, or Firm* — Keating & Bennett, LLP

(57) ABSTRACT

A method for determining an order of values for an encoding parameter of a hybrid encoding scheme for each frame of a frame sequence for use for encoding the frame sequence by means of the hybrid encoding scheme is described. Using the hybrid encoding scheme, resulting distortions and compression rates for the frames of the frame sequence are established for the case of the complete encoding of the frame sequence, and for the case of the incomplete encoding of a real partial sequence of the frame sequence. Thereupon, establishing of estimated distortions and compression rates for frames of the frame sequence takes place, followed by determining the order of values for the encoding parameter of the hybrid encoding scheme based on the established resulting and estimated distortions and compression rates.

15 Claims, 7 Drawing Sheets

OTHER PUBLICATIONS

Z. He, J. Cai, Optimal Bit Allocation foe Low Bitrate Video Streaming Applications, Proceedings of the 2002 International Conference on Image Processing, pp. I-73-I-76, 2002.*

C. Chen, Rate-Reduction Transcoding Design for Wireless Video Streaming, Proceedings of the IEEE 2002 International Conference on Image Processing, pp. 29-32, 2002.*

Kwok et al.: "Obtaining an Upper Bound in MPEG Coding Performance From Jointly Optimizing Coding Mode Decisions and Rate Control," Proceedings of the SPIE; XP-001130808; Jan. 29, 1996; pp. 2-10.

Ortega et al.: "Forward-Adaptive Quantization With Optimal Overhead Cost for Image and Video Coding With Applications to MPEG Video Coders," Proceedings of the SPIE; XP008030983; SPIE; vol. 2419; Feb. 15, 1995; pp. 129-138.

Schuster et al.: "Fast and Efficient Mode and Quantizer Selection in the Rate Distortion Sense for H.263," XP00617893; Proceedings of the SPIE; vol. 2727; Mar. 17, 1996; pp. 784-795.

Farber et al.: "Rate-Distortion Optimized Multipass Video Encoding With Application to MPEG-4," Sep. 2005 IEEE; XP010851191; pp. 866-869.

Weigand et al.: "Rate-Distortion Optimized Mode Selection for Very Low Bit Rate Video Coding and the Emerging H.263 Standard," IEEE Transactions on Circuits and Systems for Video Technology; vol. 6; No. 2; Apr. 1996; pp. 182-190.

Sethuraman et al.: "Model Based Multi-Pass Macroblock-Level Rate Control for Visually Improved Video Coding" In: 2001 Proceedings of Workshop and Exhibition on MPEG-4; Jun. 18-20, 2001; pp. 59-62.

Ramchandran et al.: "Bit Allocation for Dependent Quantization With Applications to Multiresolution and MPEG Video Coders," IEEE Transactions on Image Processing, vol. 3; No. 5; Sep. 1994; pp. 533-545.

Sullivan et al.: "Rate-Distortion Optimization for Video Compression," IEEE Signal Processing Magazine; Nov. 1998; pp. 74-90.

Ortega et al.: "Rate-Distortion Methods for Image and Video Compression," IEEE Signal Processing Magazine; Nov. 1998; pp. 23-50.

3GPP DOC S4-0304718; "Test Material and Reference Results for Video Codec Candidate Qualification Criteria," TSG-SA4 #29 Meeting; Tampere, Finland; Nov. 24-28, 2003.

"MPEG-4 Video Encoders and Decoders on Various Platforms," Fraunhofer IIS MPEG-4 Video Software; http://www.iis.fraunhofer.de/amm/download/wp_iismpeg4videosoftware.pdf; 2004.

MPEG DOC. N6231; "Report of the Formal Verification Tests on AVC," International Organization for Standardization; WAIKOLOA, Dec. 2003; pp. 1-28.

Official Communication issued in corresponding Japanese Patent Application No. 2008-529501, mailed on Nov. 9, 2010.

* cited by examiner

| SEQUENCE NAME | # FRAMES [N] | IIS RDM vs. IIS WITH FIXED Q | IIS RDM vs. DivX 5.2 |
|---|---|---|---|
| FOREMAN | 150 | 0,09 | 0,89 |
| PARIS | 150 | 0,26 | 1,17 |
| FOOTBALL | 125 | 0,02 | 0,63 |
| TEMPETE | 125 | 0,01 | 0,53 |
| CNN | 1000 | 0,74 | 1,92 |
| SPIDERMAN | 1000 | 0,33 | 0,66 |
| RED OCTOBER | 1000 | 0,34 | 0,65 |
| AVERAGE | | 0,26 | 0,92 |

ENCODING PARAMETER DETERMINATION FOR A HYBRID ENCODING SCHEME

TECHNICAL FIELD

The present invention relates to determination of encoding parameters of a hybrid encoding scheme for use for encoding a frame sequence by means of the hybrid encoding scheme, e.g. for achieving encoding with compression rate-distortion behavior as optimum as possible.

BACKGROUND

So-called hybrid encoding schemes, such as H.264/AVC, are the most successful class of video compression designs. Motion-compensated prediction and subsequent encoding, or transformation, of the prediction error, or the residual error, are the basic elements of these encoding schemes. The operation of a hybrid video encoder includes optimizing many decisions to accomplish the best possible trade-off between compression rate, or rate, and distortion, or image deterioration, considering constraints with respect to encoding delay and complexity. However, due to the use of motion-compensated prediction, or forecast, all these decisions typically depend on each other across many images, or frames, of an encoded sequence.

This means that the framework of the hybrid coding employed in all current video coding standards, such as MPEG-2, MPEG-4 or H.264/AVC, makes it very difficult to apply the optimization of coding decisions or coding parameters over time, that is, to consider several subsequent frames or images of a video sequence jointly or subject them jointly to an optimization. The fact that decisions in a current frame have a significant influence on the rate distortion behavior (R-D behavior) of subsequent or future frames leads to a dependently operating encoding scheme with an exponentially growing search space. Consequently, an R-D optimization is typically performed on a frame-to-frame basis. Such frame-to-frame R-D optimizations are described, for example, in A. Ortega, K. Ramchandran and M. Vetterli, "Bit Allocation for Dependent Quantization with Applications to Multiresolution and MPEG Video Coders", IEEE Transactions on Image Processing, vol. 3, no. 5, September 1994 and G. J. Sullivan and T. Wiegand, "Rate-Distortion Optimization for Video Compression", IEEE Signal Processing magazine, pp. 74-90, November 1998.

One approach for considering not only the current frame but the overall characteristic of a sequence is multipass encoding. In a first encoding pass, data on the statistics of the frame sequence are collected, which are then analyzed to optimize a second pass. The results from the second pass are then used for a third pass and so forth. Although multipass encoding schemes usually help to distribute the available bits more intelligently across the frame sequence, they are usually not R-D optimized.

SUMMARY

According to an embodiment, a device for determining an order of values for an encoding parameter of a hybrid encoding scheme for each frame of a frame sequence for use for encoding the frame sequence by means of the hybrid encoding scheme may have: a data establisher for establishing, using the hybrid encoding scheme, resulting distortions and compression rates for the frames of the frame sequence for the case of the complete encoding of the frame sequence with different supporting orders of values for the encoding parameter for each frame of the frame sequence, and for the case of the encoding of a real partial sequence of the frame sequence from a first frame of the frame sequence with fragment orders of values for the encoding parameter, wherein each value of the supporting orders and fragment orders is selected from a predetermined set of predetermined values for the encoding parameter, such that a real subset of the set of distortions and compression rates is acquired, as may be acquired by encoding by means of possible orders of the predetermined values for the encoding parameter for each frame; a data estimator for establishing estimated distortions and compression rates for frames of the frame sequence following the real partial sequences, under association of a fragment order to that of the supporting orders by use of which a distortion acquired for a last frame of the respective real partial sequence has a difference as small as possible to a distortion acquired using the fragment order for the last frame of the respective real partial sequence; and a determiner for determining the order of values for the encoding parameter of the hybrid encoding scheme, based on the established resulting and estimated distortions and compression rates.

According to another embodiment, a method for determining an order of values for an encoding parameter of a hybrid encoding scheme for each frame of a frame sequence for use for encoding the frame sequence by means of the hybrid encoding scheme may have the steps of: using the hybrid encoding scheme, establishing resulting distortions and compression rates for the frames of the frame sequence for the case of the complete encoding of the frame sequence with different supporting orders of values for the encoding parameter for each frame of the frame sequence, and for the case of the encoding of a real partial sequence of the frame sequence, from a first frame of the frame sequence, with fragment orders of values for the encoding parameter, wherein each value of the supporting orders and fragment orders is selected from a predetermined set of predetermined values for the encoding parameter, such that a real subset of the set of distortions and compression rates is acquired, as may be acquired by encoding by means of possible orders of the predetermined values for the encoding parameter for each frame; establishing estimated distortions and compression rates for frames of the frame sequence following the real partial sequences, associating a fragment order with that of the supporting orders by use of which a distortion acquired for a last frame of the respective real partial sequence has a difference as small as possible to a distortion acquired using the fragment order for the last frame of the respective real partial sequence; and based on the established resulting and estimated distortions and compression rates, determining the order of values for the encoding parameter of the hybrid encoding scheme.

According to another embodiment, a computer program may have a program code for performing a method for determining an order of values for an encoding parameter of a hybrid encoding scheme for each frame of a frame sequence for use for encoding the frame sequence by means of the hybrid encoding scheme, wherein the method may have the steps of: using the hybrid encoding scheme, establishing resulting distortions and compression rates for the frames of the frame sequence for the case of the complete encoding of the frame sequence with different supporting orders of values for the encoding parameter for each frame of the frame sequence and for the case of the encoding of a real partial sequence of the frame sequence from a first frame of the frame sequence with fragment orders of values for the encoding parameter, wherein each value of the supporting orders and fragment orders is selected from a predetermined set of predetermined values for the encoding parameter, such that a real subset of the set of distortions and compression rates is acquired, as may be acquired by encoding by means of possible orders of the predetermined values for the encoding parameter for each frame; establishing estimated distortions and compression rates for frames of the frame sequence following the real partial sequences, under association of one fragment order to that of the supporting orders by use of which a distortion acquired for a last frame of the respective real partial sequence has a difference as small as possible to a distortion acquired using the fragment order for the last frame of the respective real partial sequence; and based on the established resulting and estimated distortions and compression rates, determining the order of values for the encoding parameter of the hybrid encoding scheme, when the computer program runs on a computer.

The finding of the present invention is that R-D optimization, or rate-distortion optimization, may be accomplished across frames with justifiable expenditure if multipass encoding and R-D optimization are combined for video encoding. A further finding of the present invention is that this is possible if, initially, encoding of the frame sequence is performed in pre-multipasses by means of the hybrid encoding scheme for supporting orders of values for the encoding parameter, which comprise, for encoding each frame of the frame sequence, a value selected from a predetermined set of predetermined values for the encoding parameter. It is indeed not necessary to perform all possible $M^N$ passes, where M indicates the number of the predetermined values of the predetermined set of predetermined values for the encoding parameter and N indicates the number of frames of the frame sequence. Rather, according to a finding of the present invention, it is sufficient to limit further encodings to real partial sequences of the frame sequence, i.e. such beginning at the first frame of the frame sequence, even though they are actually not yet suitable for an R-D optimization due to the incompleteness. The afore-mentioned further finding of the present invention is indeed that it has been observed that R-D behavior of future, or subsequent, frames of the frame sequence, or the accordingly encoded frames, does not so much depend on the exact sequence of the encoding, or the encoding parameter values used for previous frames, but mainly on the quality or distortion of the reference frame previously reconstructed. This finding is, according to the invention, utilized by estimating, for continuing the encoding of the real partial sequence of frames, the actual distortion or image quality values and compression rate values by those distortion and compression rate values obtained from encodings or previous estimations for encoding the frame sequence, having, for the last frame of this real partial sequence, a distortion value similar or comparable to the distortion value as resulted for encoding the real partial sequence by means of a corresponding fragment order of encoding parameters.

According to a particular embodiment of the present invention, the pre-encodings of the frame sequence are performed using the different supporting orders of values for the encoding parameter for each frames of the frame sequence by means of the hybrid encoding scheme with such supporting orders which constantly comprise, for the frames of the frame sequence, a respective different one of the predetermined set of values for the encoding parameter. These pre-encodings define main paths from a root of a tree structure to the leaves thereof. When encoding the frame sequence using the supporting orders of encoding parameter values, the distortion and compression rate value, too, are determined for each current frame, as would result with another value from the predetermined set of encoding parameter values than that of the main path. The result consists in paths from the root of the tree structure, branching, from the main paths at branching points, from the main path to end immediately, whereby incomplete paths develop through the tree structure. These are "returned back" onto the main paths by comparing the distortion value at the ends of these incompletes paths to the distortion values at the nodes of the tree structure along the main paths in the same tree structure level. Thus, the ends of these incomplete paths are returned back, via transition branches, from the previous tree structure level into the current tree structure level onto the main paths, whereby a state transition diagram results, from which an optimum path may be established such that it leads to an optimum order of encoding parameter values for encoding the frame sequence with regard to a desired trade-off between compression rate and image quality, or image distortion.

BRIEF DESCRIPTION OF THE DRAWINGS

Embodiments of the present invention will be detailed subsequently referring to appended drawings, in which:

FIG. 7 is a table for listing further comparison results for other test sequences.

DETAILED DESCRIPTION

Figure 1:
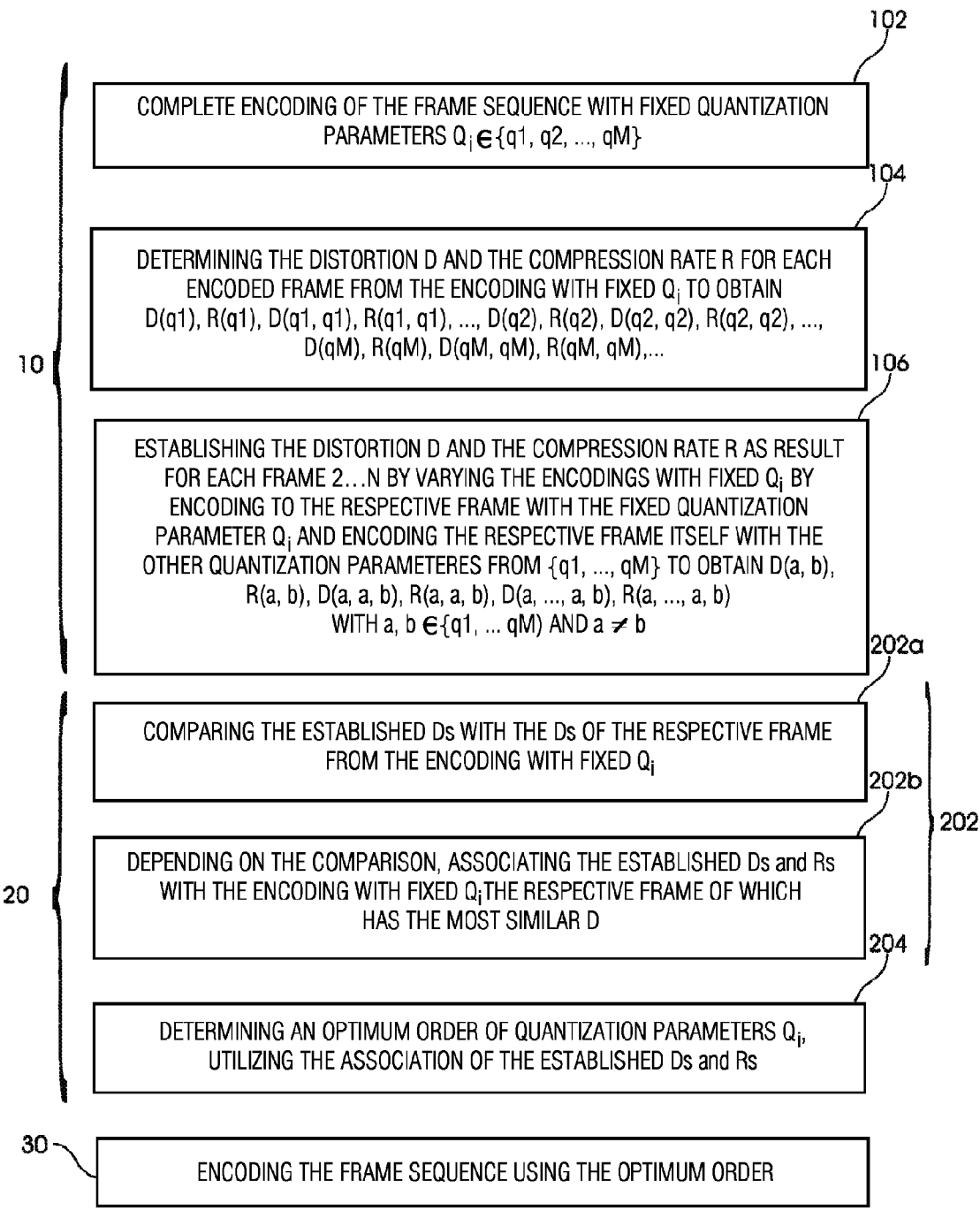
FIG. 1 is a flow diagram of a method for determining an optimum order of quantization parameters, with subsequent encoding of the frame sequence using the optimum order, according to an embodiment of the present invention.

In the following, an embodiment of the present invention is described referring to the figures, which is directed to the selection of an optimum quantization parameter (Q) for each frame, such that the compression rate/distortion ratio is, on the whole, optimized in a desired manner. In this context, it should be understood that the present invention may also be applied to optimizing other encoding parameters of a hybrid encoding scheme, as will be described in further detail subsequent to the description of figures.

Like for all multipass encoding schemes, in the embodiment described in the following, a higher variation of the bit rate and an increased complexity should be accepted, which, however, are acceptable constraints for many applications ranging from MMS (multimedia messaging service) to DVD (digital versatile disc) since encoding there is performed off-line, or beforehand, and only once.

Prior to the actual description of the method of operation for quantization parameter determination, first the actual problem will once again be formulated. Then, the algorithm will be described with reference to FIG. 1-4, whereupon encoding results will be presented which resulted by applying the method according to FIG. 1-4 to MPEG-4 SP, as well as a comparison of the results with results as obtained by means of DivX 5.2 as a further known multipass encoding scheme.

Hybrid encoding schemes lead to encoding of a particular frame of a frame sequence by motion-compensated prediction of the respective frame from encodings of previous frames of the frame sequence and subsequent encoding of the prediction error. According to the embodiment described in the following, the subsequent encoding includes a quantization, such as a quantization of pixel values of the difference image or a quantization of the transformation coefficient of a difference image.

The problem is now that a variation of the quantization parameter for a particular frame not only leads to a change in the distortion and the compression rate for the particular frame, but further also to a change in the distortion and the compression rate of subsequent frames due to the prediction. Thus, the quantization parameters for the individual frames cannot be selected, or optimized, independently from each other. Rather, due to the dependent encoding, a dependent optimization has to be used to determine the quantization parameters for the individual frames, considering the mutual influence.

For simplification, particularly the problem of dependent encoding of predicted frames, or P-frames, is considered in the following, wherein frames predicated bi-directionally, or B-frames, are ignored for simplification and further no enforcement of intra-encoded, or intra-encodable, frames or I-frames is used during the encoding, wherein the latter, of course, is possible. In other words, the following description is based on an encoding pattern of IPPP . . . P, or on a hybrid encoding scheme with an encoding pattern according to which the first frame is intra-coded according to the hybrid encoding scheme, while the following frames of the frame sequence are P-coded or are P-frames and, thus, are encoded under prediction of the frame and encoding of the prediction error.

In the following, the rate or compression rate in a frame i is denoted as $R(Q1, Q2, \ldots, Qi)$, while the distortion in a frame i is denoted as $D(Q1, Q2, \ldots, Qi)$, where Qi denotes the quantization stage distance used for frame i, and where the value i indicates the position of the frame in the frame sequence to be encoded. According to the present embodiment, R corresponds to the number of bits in frame i, while D is measured as the mean squared error (MSE). In other words, R corresponds to the number of bits needed for encoding frame i, while D is the mean squared error across the pixels of the decoded frame obtained from encoding frame i. However, it should be understood that other definitions for the compression rate R and the distortion D are also possible.

It is emphasized that all previous Qs, that is, the quantization values used for encoding the previous frames, need to be known or specified for the determination of R and D because of the dependency resulting above due to the prediction. For example, one has to be aware that in a frame#2 $R(1, Q2) \neq R(10, Q2)$ and $D(1, Q2) \neq D(10, Q2)$ because the quality of the first frame, or the encoding of the first frame, depending on the quantization parameter value Q1 used for encoding this frame and thus being larger for Q1=1 than for Q1=10, has a significant influence on the compression rate/distortion result of the second frame, or the encoding.

Further, it should be understood that if the values R and D are jointly referred to, or if the encoding state is to be designated in general, the notation (Q1, Q2, . . . , Qi) is used.

The optimization task to be solved thus includes the optimum selection of quantization values Qi* for each frame I, under a rate constraint $R_{max}$, and may be formulated as $$\min[D(Q1)+D(Q1,Q2)+ \ldots +D(Q1, Q2, \ldots QN)]$$

$$Q1, Q2, \ldots QN$$

under the secondary condition that $$R(Q1)+R(Q1,Q2)+ \ldots +R(Q1, Q2, \ldots QN) < R_{max}$$

As is described in A. Ortega and K. Ramchandran, "Rate-Distortion Methods for Image and Video Compression", IEEE Signal Processing magazine, pp. 23-50, November 1998, for example, this optimization problem with a constraint condition may be solved by the equivalent problem without constraint condition:

$$\min[J(Q1)+J(Q1,Q2)+ \ldots +J(Q1, Q2, \ldots, QN)]$$

$$Q1, Q2, \ldots QN$$

where i. (1)

$$J(Q1, Q2, \ldots, QN) = D(Q1, Q2, \ldots, QN) + \lambda R(Q1, Q2, \ldots QN)$$

is the Lagrange cost and $\lambda \geq 0$ is the Lagrange factor used to select the desired operating point, that is, the trade-off between compression rate on the one hand and distortion on the other hand.

The problem of solving equation (1) lies in the exponential growing of the search degree. If M different quantization values are considered for each frame, then $M^N$ combinations have to be evaluated for a sequence of N frames. The data collection phase in particular, that is, encoding the frame sequence $M^N$ times, results in an unacceptable complexity.

After the problem successfully addressed by the following embodiment for optimizing an order of quantization parameters has been previously described, in the following, an intuitive explanation why it is desirable to optimize the quantization parameter Q on a frame basis shall be given prior to the description of this embodiment. As an example, a cut to an almost static scenario, or scene, shall be considered. If the first frame after the scene cut is encoded with very high quality, then all following frames benefit from this encoding decision since they may simply copy from this frame encoded with high quality for a long time. Consequently, a very low, or fine, quantization parameter value Q should be selected. However, if the scene after the cut comprises a complex motion and a detailed texture, the situation is entirely different. Then the bits used for the first frame, or the encoding thereof, will not have an equally positive effect on subsequent or future frames. However, the embodiment for a quantization parameter order determination described in the following will automatically detect such situations by evaluating the long-term R-D trade-off and thus selecting the optimum quantization value Q for each frame.

In the following, a method for determining an optimum order of quantization parameters for use in a hybrid encoding scheme for encoding a sequence of frames according to an embodiment of the present invention is described with reference to FIG. 1, wherein the order of quantization parameters, or quantization parameter values, indicates a quantization parameter value to be used for encoding each frame of the frame sequence. In the following, the method is sometimes also referred to as R-D-optimized multipass algorithm or RDM algorithm.

The RDM algorithm is roughly divided into three steps which, in turn, are divided in substeps, wherein the latter are illustrated by rectangles in FIG. 1, which are united by braces to the three rough steps. The first step 10 is the data collection in which the frame sequence is encoded several times using a fixed quantization parameter value Q which, however, is different for each pass. In the first step, different encoding states or different tuples result for each frame of the frame sequence from distortion and compression rate, describing the encoding of the respective frame using different quantization parameter orders for the respective frame and the previous frames. In the second step 20, a trellis, or a state transition diagram, is constructed from the R-D data thus collected, wherein an optimum path, or the optimum order of quantization parameter values $Q_i^*$, is selected using a cost function. Thus, step 20 represents the actual optimization step. Then, in a last step 30, a final encoding of the frame sequence is performed using the obtained optimum quantization parameter values $Q_i^*$ for each frame as obtained from optimization step 20, whereby encoding of the frame sequence is obtained with an optimum R-D trade-off, with restrictions with respect to the trueness in individual cases, as will be discussed in the following.

In other words, both the first steps 10 and 20 represent the actual determination of the optimum quantization parameter value order, while step 30 only represents the final encoding step using this quantization parameter value order. For this reason, the main focus in the following is on steps 10 and 20. For description of the substeps of steps 10 and 20, a highly simplified example is used for explanation purposes, where the number of frames of the frame sequence to be encoded is N=3 and different predetermined quantization parameter values $Q_i \in \{2, 4, 6\}$ are admitted as possible values for the quantization parameter values of the optimized quantization parameter value order M=3 sought, wherein, of course, also other numbers of frames and other numbers of possible quantization parameter values are also possible.

The data collection step 10 is divided into three substeps, of which the first substep 102 is to encode the frame sequence to be encoded using different supporting orders of values for the quantization parameter Qi for each frame of the frame sequence by means of a hybrid encoding scheme. In other words, the frame sequence of N frames is completely encoded M times. In this process, such quantization parameter orders with a fixed quantization parameter value Qi are used as different supporting orders of quantization parameter values, each with a different quantization parameter value Qi. Thus, in step 102, the frame sequence is encoded M times using a fixed quantization parameter value $Q_i \in \{q1, q2, \ldots qM\}$ for all N frames of the frame sequence. Step 102 is performed such that, for each frame, not only the encoding thereof is obtained, such as the respective quantized transformation coefficients of the prediction error, but further also the frame resulting from the encoding by decoding. For this frame of step 102 obtained by encoding, distortion D and compression rate R are respectively determined in substep 104. Thus, in step 104, the R-D data points (q1), (q1, q1) . . . result from the first complete encoding of the frame sequence, or the first pass. This similarly applies to other passes, wherein the data points (qM), (qM, qM) . . . result from the Mth pass of step 102 and step 104.

Thus, steps 102 and 104 correspond to an encoding with a fixed quantization parameter and form the basis for the entire multipass algorithm. By optimizing the quantization parameter values on a frame basis, an encoding is achieved which is better than any of the M encodings with a fixed quantization value, as expected.

Since a change of the quantization parameter value is to be allowed from frame to frame, the data measured in steps 102 and 104 are not sufficient. Rather, additional data need to be measured, which is performed in the third substep 106 of data collection step 10. In order to be able to decide whether a change to a new quantization parameter value Q, or another quantization parameter value Q, is better than continuing with the fixed quantization parameter Q, one needs to know in which compression rate and distortion this change would result. Consequently, in substep 106, distortion D and compression rate R are determined, as result for each frame 2 . . . N, by varying the encodings with fixed Qi, by encoding up to the respective frame with the fixed quantization parameter value Qi and encoding the respective frame itself with the other quantization parameter values from $\{q1, \ldots, qM\}$, whereby further data points (a, b) (a, a, b) . . . (a, . . . a, b) with $(a, b) \in \{q1, q2, \ldots qM\}$ and $a \neq b$ are obtained.

Substeps 102 and 106 are linked or nested with each other. While the encoding passes 102 are performed with a fixed quantization parameter value, the prediction error is not only encoded with the respective fixed quantization parameter value Qi, as is necessary for step 102, but, in step 104, further also with the other quantization parameter values $Q_j \neq i$, whereupon the values R and D are measured at the respective resulting encoding for the respective frame. Performing the actual encoding in step 102 with the fixed quantization parameter value Q only for the respective pass avoids exponential growing of the encoding expenditure. It is further advantageous that only comparatively small expenditure is necessary for acquiring the additional values D and R in substep 106, since the motion estimation, or the motion-compensated prediction from the hybrid encoding of the respective frame, mostly forming the more complex part of the hybrid encoding, has to be performed only once, and, in addition, this prediction has to be performed once anyway for the complete encoding, or the complete encoding pass, in step 102. In substep 106, only encoding of the prediction error with the other quantization parameter values remains to be performed, as has just been described.

To summarize, all data points collected in steps 102-106 may be described with $$(a, a, \ldots, a, b), \text{with } (a,b) \, \{q1, q2, \ldots qM\}$$

Figure 2:
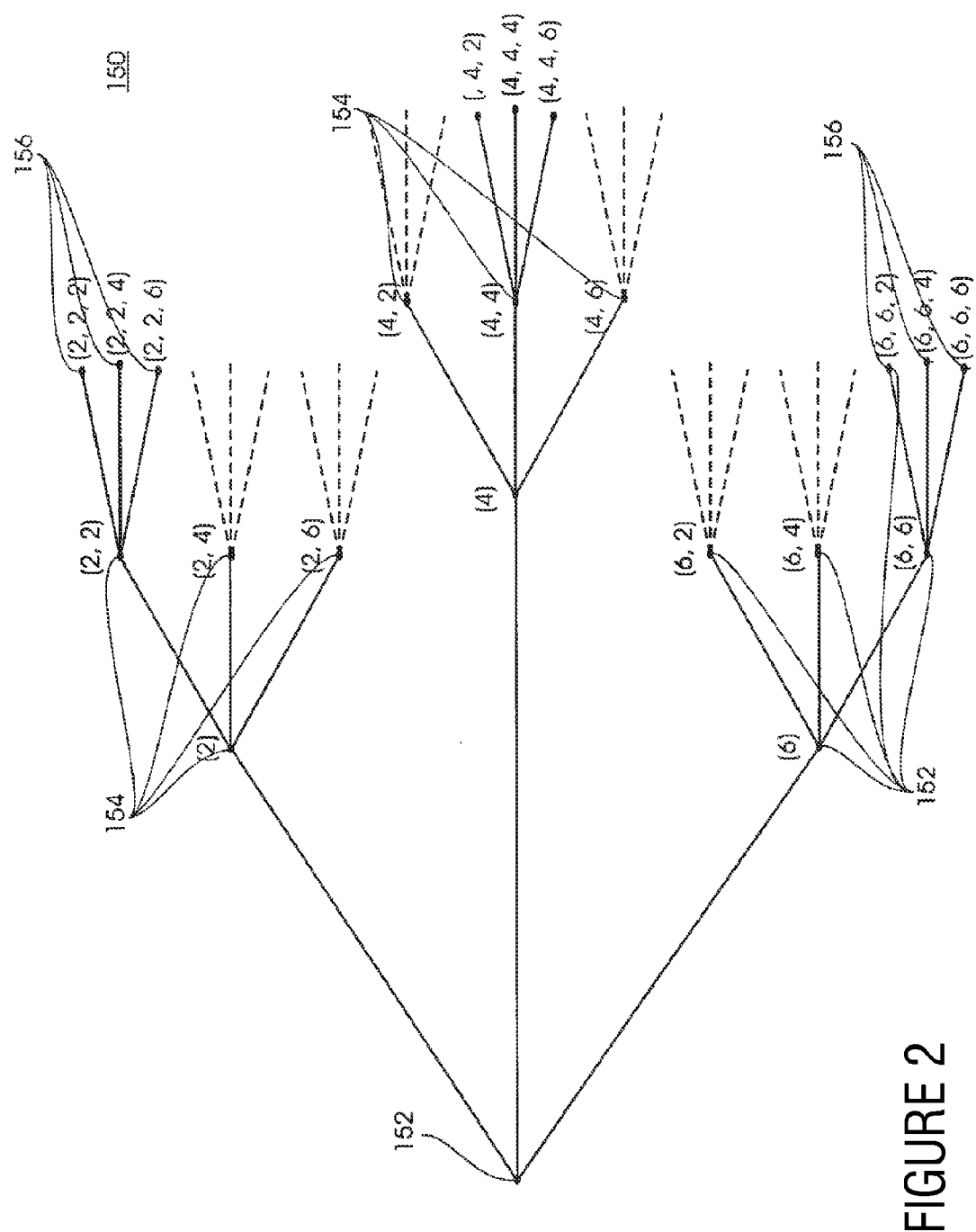
FIG. 2 is a tree structure for illustrating the data on distortion and encoding parameters for different quantization parameter orders, collected in the method of FIG. 1.

In order to illustrate the substeps 102-106 once again with respect to their calculation expenditure, reference is made to FIG. 2. As already indicated above, in steps 102-106, the frame sequence to be encoded is indeed not performed for each possible sequence of quantization parameter values Qi from q1, q2, . . . , qM, which would necessitate $M^N$ passes. If all these passes were performed, one would obtain $$\sum_{n=1}^{N} M^n$$

data points, or R-D pairs, namely one pair per possible encoding of each frame n of the N frames, for which, due to the dependency on the quantization parameter values previously used, not only M possibilities exist, but correspondingly more.

All these theoretically derivable data points may be arranged in a tree structure as generally indicated 150 in FIG. 2. In this context, M branches respectively branch from root 152 and each branching node 154, wherein the root and the branching nodes 152 or 154, respectively, are illustrated with dots, and the branches are illustrated with lines between the dots in FIG. 2. Tree structure 150 comprises N hierarchy or tree structure levels, wherein root 152 represents the $0^{th}$, for example. Each of the M branches from root 152, or a branching node 154, is associated with a different one of the M quantization parameter values Qi so that the above-mentioned possible data points may be associated with the branching node 154 and the leaves 156 of the tree structure in this manner.

Now, in FIG. 2, not all possible data points are marked with bold-type dots in the tree structure 150, but rather only those which were established in steps 102-106. Branches leading to data points which might possibly be established in steps 102-106 but are not are indicated with dashed lines in FIG. 2. Thus, FIG. 2 illustrates the complete exponential search tree of the above example with N=3 and M=3, wherein the subset of the data actually measured is indicated with bold-type dots. From this illustration, it may be easily seen that the calculating complexity of steps 102-106 is reduced from $M^N$ to $M^2$ compared to the calculating complexity for performing the encoding for all possible quantization parameters orders.

Referring back to FIG. 1, the optimization step 20 following the data collection step 10 will be described in more detail in the following. Optimization step 20 substantially consists of two substeps 202 and 204. In the first substep 202, a state transition diagram, or trellis, is constructed from the collected data points or D/R tuples. This substep 202 will be explained in more detail in the following with reference to FIGS. 3 and 4. In the second substep 204 of the optimization step 20, the generated state transition diagram is searched using the Viterbi algorithm and a Lagrange cost function. This step includes an optimization operation, such as described in the documents of Ortega and Ramchandran previously mentioned. The trellis, or state transition diagram, constructed in step 202 comprises M main branches, or main paths, corresponding to the encodings with fixed quantization parameter Q of step 102. As more frames are encoded, the state transition diagram grows from left to right, wherein the corresponding states along a main branch are denoted (a, a, . . . , a) with a∈{q1, q2, . . . , qM}. Each branch connecting two states of the state transition diagram is characterized by the quantization parameter value Q used to reach the next state, and the resulting values for R and D for this frame.

The additional data points (a, a, . . . , a, b) with a≠b of step 106 are also added to the state transition diagram. Consequently, from each state on a main branch, there are M−1 transition branches leading away from this main branch to leave it. This is shown, for example, in FIG. 3 for the above example of FIG. 2 with N=3 and M=3, wherein it should be explicitly understood that the state transition diagram illustrated in FIG. 2 is equivalent to that part of the tree structure of FIG. 2 which concerns the data points obtained from steps 102-106. Only the arrangement of the data points, or the tree structure, is different.

Figure 3:
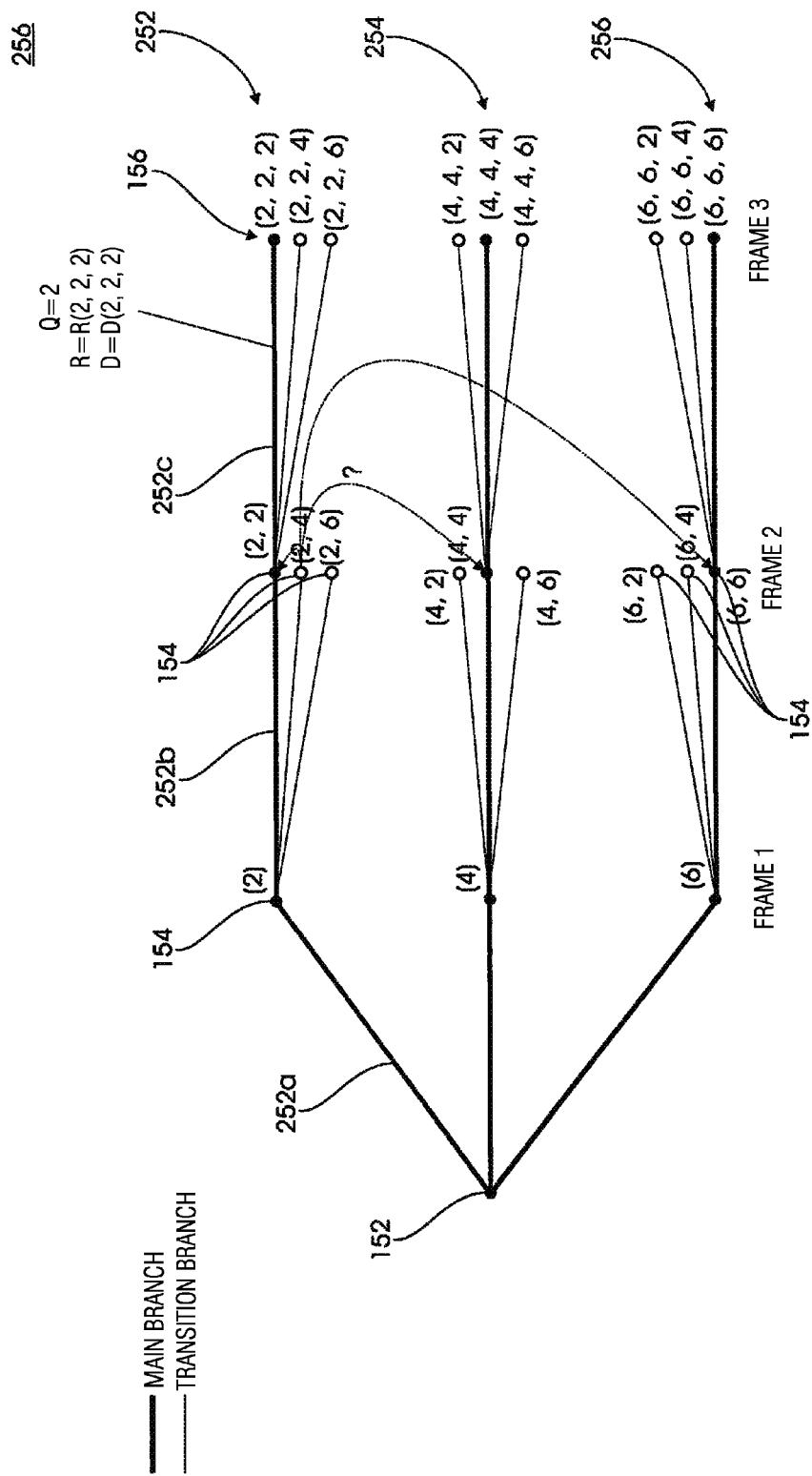
FIG. 3 is a subtree of the tree structure of FIG. 2, concerning encodings, or quantization parameter orders, for which values for distortion and compression rate have been established, with schematic arrows for illustrating the return of the incomplete paths onto the main paths.

As far as it has previously been described, the construction of the tree structure of FIG. 2, or the corresponding state transition diagram of FIG. 3, represents an inherent result of steps 102-106 of data collection step 10. In this context, the tree structure illustration in FIG. 2 only served for illustrating the reduction of the calculation expenditure according to the method of FIG. 1 over an optimization method according to which each quantization parameter order is "tried". FIG. 3 is limited to the part of the tree structure of FIG. 2 that concerns the data points for which D-R data have actually been obtained in the data collection step 10. Thus, FIG. 3 illustrates the starting point of step 202 for constructing the state transition diagram to be accomplished. As already mentioned, the main difference between FIG. 2 and FIG. 3 is that the arrangement of the data points 154-156 in FIG. 3 is different to that of FIG. 2. However, in the transition from the tree structure representation of FIG. 2 to the state transition diagram of FIG. 2, generally indicated 250, a further change is that the association of the D-R data does not anymore occur such that they are associated with the nodes 154, or leaves 156, referred to as states in the case of the state transition diagram 250, but this information, together with the quantization parameter value Q of the branch which is associated in the tree structure diagram with the branch associated from one state to another, are associated with the branch in the state transition diagram which leads to the respective state. This will be discussed in more detail in the following. The reason for this is that is the goal of the construction of the final state transition diagram to return, at their end points, the incomplete paths in the tree structure of FIG. 2 back onto any of the main branches, so as to allow a subsequent search algorithm used in step 204 to reach one of the main branches again in the optimization of the quantization parameters in variations of a quantization parameter, where it again obtains information on D-R data. In the following, it will be described how this is performed.

In FIG. 3, the main branches are illustrated by thick lines between the states 152-156. A first main branch 252 is associated with the quantization parameter 2 and leads from the root, or the initial state 152, over two branching nodes, or intermediate states 154, to a leaf, or final state 156, wherein the intermediate states 154 and the final state 156 on the main branch 252 correspond to the encodings of the three frames. The main branch 252 is comprised of three main branches 252a, 252b and 252c connecting the individual states 152-156 along the main branch 252 from the initial state 152 to the final state 156 with each other so as to lead from the initial state 152 to the final state 156. As is shown in FIG. 3 for the main branch 252c, each main branch is associated with the fixed quantization parameter value, namely Q=2, as well as the D-R pair to which quantization with this quantization parameter leads, that is (2, 2, 2). Accordingly, also a main branch 254 and a main branch 256 lead away from the initial state 152, which are associated with the quantization parameter value 4, or 6, and also lead over three main branches and over two intermediate states to a final state 156, wherein these states again correspond to the N=3 frames.

The transition branches leading away from the main paths 252-256 are illustrated in FIG. 3 with thin lines. The final states thereof are illustrated with blank circles 154, or 156. As may be seen from FIG. 2, all transition branches are "dead ends", that is, branches leading from a state 154 along a main branch 252-256 to a final state, from which no further branch leads to a state of the next-higher level associated with the next frame. In other words, these final states are not connected with any other state. Consequently, the state transition diagram, or trellis, in its current form up to now as inherently obtained from steps 102-106 is not yet suitable for use for optimization since a change in the quantization parameter value is not yet possible. For this reason, the goal of step 202 is to return those final states back to states on the main branches 252-256, as has been already mentioned in the foregoing and will be described in the following.

To illustrate the idea underlying step 202, a key assumption underlying step 202 will be explained at this point. This key assumption allows the construction of an approximated state transition diagram. In particular, it is assumed that the R-D property of future frames does not depend so much on the exact sequence of the encoding, or the quantization parameter values used for encoding previous frames, but mainly on the quality or the distortion of the reference frame previously reconstructed. In other words, it is assumed that if two different encoding paths in the state transition diagram of FIG. 3 result in similar D, and particularly two different encoding paths ending in the same level or at the same frame, that is, for which $D(Q1, Q2, \ldots, Q_n) \approx (Q1', Q2' \ldots Qn')$, the R-D behavior in the following frames with k>n will also be similar. Although this assumption seems to be intuitively justified, it should be understood that this assumption does not necessarily hold in general, of course. Nevertheless, the assumption is usually confirmed. If an optimum selection or an optimization is referred to at some points in the present application, this should be construed as meaning "optimum" under the assumption just discussed.

Based on this similar-distortion assumption just explained, states with a similar distortion are merged with each other in step 202 to obtain a connected state transition diagram. For this purpose, particularly in a first substep of the merging step 202, namely substep 202a, an established value for D of a transition branch leading to a final state, that is, a dead-end, is compared to the D-values of the corresponding frames as were obtained from the encoding with fixed quantization parameter values and as are associated with the main branches ending at a state on one of the main branches 252-256 lying in the same level as the respective final state. Depending on this comparison, in a subsequent substep 202b, this transition branch is redirected to end at a state on one of the main branches 252-256 which lies in the same tree level or concerns the same frame, to which a main branch 252b leads, which is associated with a D value which is closest to the D value of the corresponding transition branch. This is exemplarily indicated in FIG. 3 with dashed lines and a quotation mark for a transition branch leading from the frame 1 state on the main branch 252 to the final state (2, 6), with which the quantization parameter Q=6 as well as the D value D=D(2,6) is accordingly associated. As already described, the states from the main branches 252-256 are used as reference points, wherein the transition branches leaving the main branches are merged to the closest state on one of the main branches— using the distortion as the similarity measure. Relating to the case of the transition branch exemplarily highlighted in FIG. 3, which shows the final state (2,6), this means that D(2,6) is compared with D(2,2), D(4,4) and D(6,6) (202a), wherein the closest value is determined (202b) and this closest value indicates where the transition branch leading to the state (2,6) should be redirected to, or to which of the states on the main branches 252-256 of the same frame level to which the dashed arrows in FIG. 3 are pointing the final state (2,6) is to be merged. This merging operation 202 is repeated for each transition branch.

Figure 4:
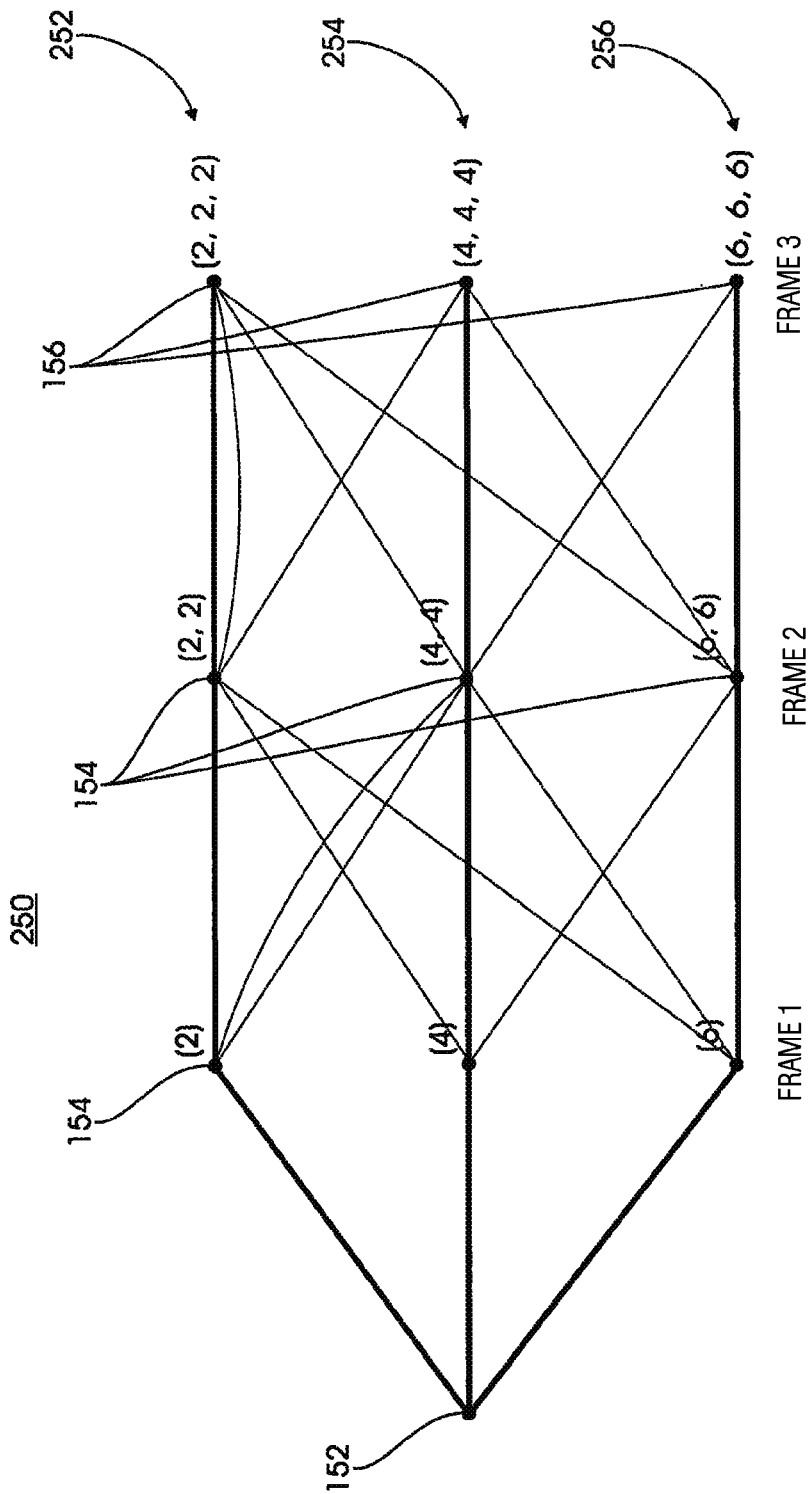
FIG. 4 is a resulting state transition diagram, or a resulting path trellis, after returning the incomplete paths back onto the main paths.

The result of step 202a and 202b for the example of FIG. 3 is shown in FIG. 4. FIG. 4 thus shows the constructed state transition diagram after redirecting the transition branches to states on the main branches. Again, it should be explicitly understood that, in contrast to the tree structure illustration of FIG. 2, a pair of states may indeed be connected by more than one branch. These branches correspond to differently associated quantization parameter values and also comprise different associated R-D values. In general, the structure of the state transition diagram is signal-dependent and irregular. As already mentioned above, each branch comprises an associated Q, R and D value.

Referring to the final constructed state transition diagram shown in FIG. 4, it should be understood that it is possible to select branches, i.e. a main or transition branch, one after the other from the initial state 152 such that the quantization parameter values Q associated with these branches result in each of the $M^N$ possible orders of quantization parameter values. In other words, the state transition diagram of FIG. 4 allows the selection between $M^N$ different paths from the initial state 152 to one of the final states 156, which all correspond to a complete encoding of the frame sequence to be encoded with different quantization parameter orders. A sum of the D, or R, values associated with the transitions used in this context results in an estimation of distortion and rate of the encoding of the overall frame sequence by means of the corresponding Q order.

Now the actual optimization step takes place in step 204. In this optimization step, a Viterbi algorithm is used, for example, to find the optimum path through the constructed state transition diagram. As an optimization criterion, the accumulated Lagrange cost until frame i may be used. It should be understood that the Viterbi algorithm must be operated with a predetermined Lagrange factor λ. Accordingly, if a certain rate constraint $R_{max}$ has to be achieved for the suitable value of λ using a convex-hull search, the Viterbi algorithm has to be applied several times. Compared to the data collection step, however, this only results in a minor calculating complexity increase. After finding the minimum J, a back tracking is used to find the optimum path, it is, the order of quantization parameters Qi*.

As mentioned in the foregoing, in the last step 30, the frame sequence is encoded using the optimum order of quantization parameter values Qi*, if desired, wherein it should be understood that, since the state transition diagram was the result of an estimation as described in the foregoing, the actual distortion and the actual compression rate of the encoded frame sequence may be different than would be expected from the minimum of the Lagrange cost function, for example.

Before possible alternatives to the method of operation described in the foregoing will be dealt with in the following, possible implementation, or application, possibilities will be dealt with in the following. Firstly, it should be understood in particular that although only the method for determining an optimum quantization parameter order has been described in the foregoing, this method, of course, may be easily implemented in a device, such as an ASIC, an FPGA or similar. Additionally, the blocks illustrated in FIG. 1 may be implemented as subcircuits of an integrated circuit, for example, which are capable or configured to execute the steps there described. Further, it is possible to execute the method described in the foregoing as a computer program comprising subprogram routines configured for executing the individual steps of FIG. 1. Consequently, FIG. 1 in so far also illustrates a corresponding device for determining an optimum order of quantization parameter values, or the encoding of a frame sequence under optimization of the quantization parameters.

Further, the above RDM algorithm may be applied to any hybrid video encoding scheme. Particularly, implementation results were obtained by using the MPEG-4 simple profile (SP), wherein these implementation results are described in the following.

Figure 5:
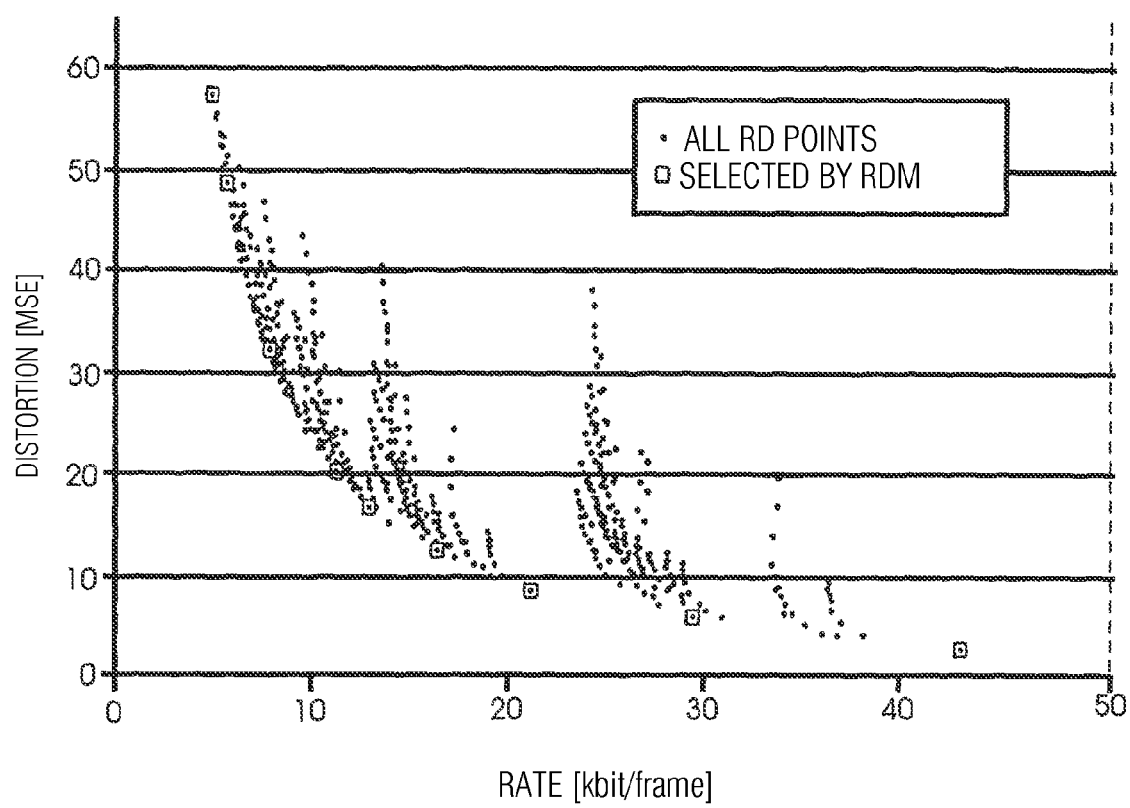
FIG. 5 is a graph in which, on the one hand, the resulting compression rate/distortion tuples for all possible orders of quantization parameters, and, on the other hand, the orders determined according to a method according to FIG. 1, are plotted.

In a first experiment, the first N=3 frames of the Foreman sequence (QCIF, 15 fps) were used, wherein M=8 quantization parameter values were allowed for each frame. For this limited example, it is still possible to encode all $M^N=512$ combinations illustrated as R-D points in FIG. 5, wherein in FIG. 5, the compression rate is indicated along the horizontal axis in kBit per frame, and the distortion is indicated along the vertical axis as mean squared error. Some of the 512 points are enclosed in a box. These points were selected by the RDM algorithm of FIG. 1, using MPEG-4 SP, for different values of λ. As can be seen, the selected points are close to the convex-hull ends of the data set and, therefore, also close to the optimum solutions.

In a second experiment, four standard test sequences (Foreman, Paris, Football, Tempete) and three additional sequences (CNN, Spiderman, Red-October) were encoded in QCIF resolution at 15 fps, or frames per second. The three additional sequences include scene cuts and scenes with different complexity, where multipass algorithms show their actual strength. For the encoding, the Fraunhofer-IIS MPEG-4 SP video codec was used, which is also used in MPEG-4 and 3GPP as the baseline codec for evaluation, wherein MPEG Doc. N6231, "Report of the Formal Verification Tests on AVC", Waikoloa, December 2003 and 3GPP Doc. S4-030718, "Test Material and Reference Results for Video Codec Candidate Qualification Criteria", Tampere, November 2003 are referenced. This codec, or this encoding scheme, uses an R-D optimization mode decision and shows a good R-D performance, wherein http://www.iis.fraunhofer.de/amm/download/wp_iismpeg4videosoftware.pdf is referenced for further details.

Figure 6:
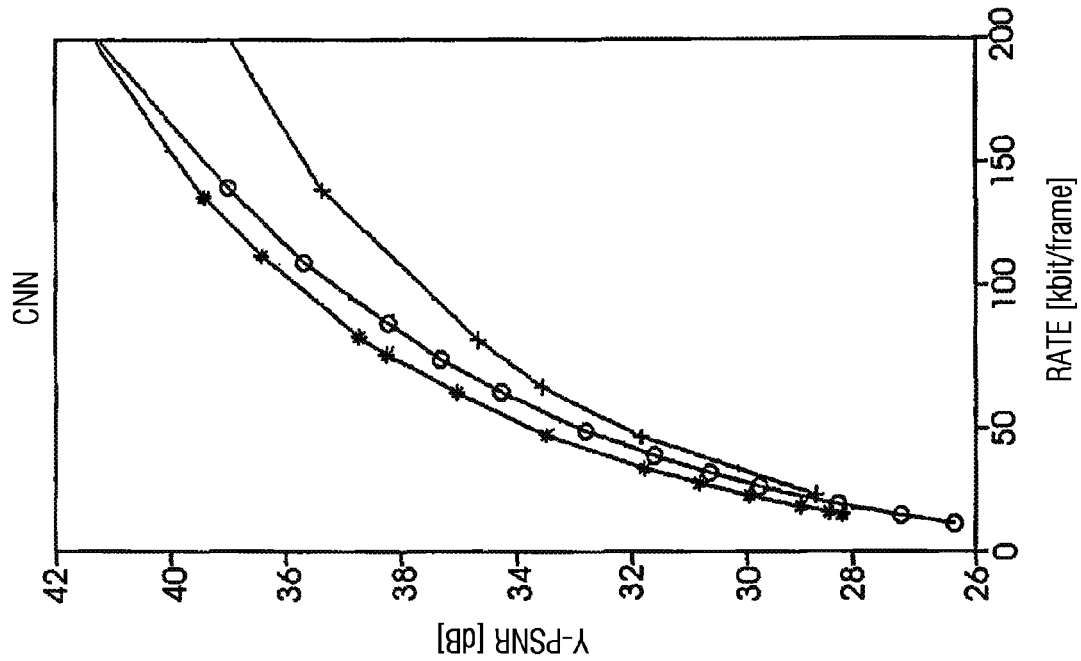
FIG. 6 are two graphs for comparing the resulting rate/distortion pairs in the case of using a quantization parameter fixed for all frames, in the case of a method according to FIG. 1, and in the case of using DivX for two different test sequences (left graph, right graph)
Figure 6:
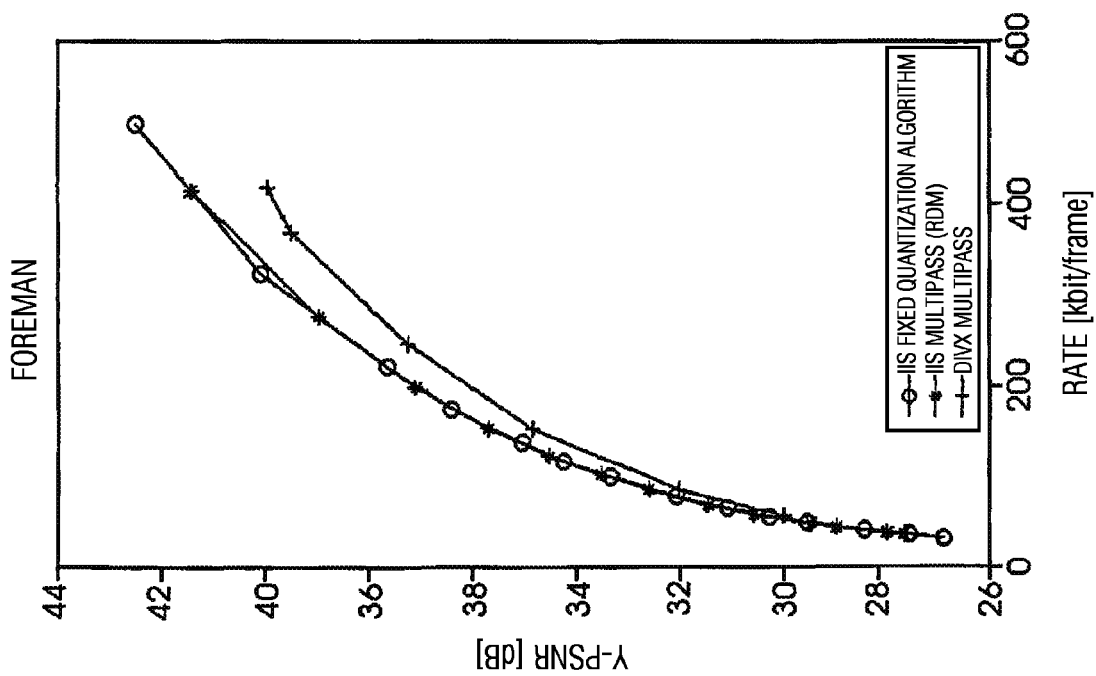

For sequences with scene cuts and time-varying complexity, multipass encoding may prove its usefulness. One such sequence is the CNN sequence, in which an average PSNR improvement of 0.74 dB may be achieved with the RDM algorithm, as can be seen in the right graph of FIG. 6, on the horizontal axis of which the compression rate is indicated in kBit and in the vertical axis of which the average luminance PSNR value is indicated in dB. In particular, the right graph of FIG. 6 shows three D-R curves for the CNN sequence, as were obtained from measurements using the RDM algorithm (*), the above-mentioned video codec of Fraunhofer with a fixed quantization parameter value (0) and with a comparison multipass algorithm, namely DivX codec (+). In this context, it should be understood that the subjective quality is often more improved by using the RDM algorithm presented above than is indicated by the PSNR gains. Particularly during scene cuts and fades the RDM algorithm provides an improved subjective quality by spending bits more intelligently, i.e. where they are useful for the future encoding process. Consequently, it has been found that minimizing the mean squared error over the entire sequence has a positive effect on subjective quality.

As previously mentioned, FIG. 6 compares the RDM results (*) with the results as were obtained by the DivX 5.2 codec (+). In this context, it should be understood that both codecs use the same coding tools and, in particular, may be coded with the same MPEG-4 SP-compliant decoder. Beyond this, both encoders use multipass encoding and R-D optimization mode decision. The average PSNR gain is 0.89 dB and 1.92 dB for the Foreman and CNN sequence, respectively, wherein the comparison with respect to the Foreman sequence is illustrated in the left graph of FIG. 6. Further results for all test sequences mentioned above are summarized in the table shown in FIG. 7. The typical gain for sequences with time-varying complexity, that is, the above sequences CNN, Spiderman, Red October, is 0.47 dB.

It should further be understood that the DivX codec does not necessarily work only with the mean squared error as the only optimization criterion. Consequently, the comparison here presented must be treated with caution. However, it has been found that high PSNR gains correlate very well with subjective quality. Consequently, the inventors of the present invention assume that a PSNR value works very well as an objective quality measure as long as it is used in connection with the same encoding scheme and the same sequence, which are conditions fulfilled in the present case.

Thus, the previous embodiment provides an RDM algorithm for video encoding that provides improved R-D behavior by multipass encoding. This RDM algorithm converts the exponential search tree to a linear state transition diagram, which makes R-D optimization possible in the first place. This is achieved by bundling states with similar distortion—utilizing the assumption that similar R-D behavior will result for future frames. The application of the RDM algorithm to MPEG-4 SP shows a typical average PSNR gain of 0.3 dB, and compared to DivX 5.2 a gain of up to 2 dB.

Besides, it should be understood that above-presented RDM method would, of course, be applicable to the H.264/AVC standard, too, by extending the above-explained similar distortion assumption to the use of multiframe motion compensation.

In still other words, a compression rate—distortion-multipass video encoding method was described in the foregoing, which is applicable to MPEG-4, for example, and addresses the problem of dependent quantization in a hybrid encoding scheme by constructing, or building, a state transition diagram from the exponentially growing search tree, which is then searched using a Lagrange cost function, for example. To avoid exponential growing, states with similarly distorted reference frames were merged, or united, based on the assumption that a similar compression rate—distortion behavior will result for future frames. The goal to select an optimum set of quantization parameter values, one for each frame, such that the overall compression rate—distortion behavior is optimized has substantially been achieved.

With respect to the foregoing description, it should be further understood that the embodiment described in the foregoing for determination of quantization parameter values may, of course, be varied in many respects and may be generalized. For example, the present invention is not limited to determination of an optimum order of quantization parameter values. Rather, also other encoding parameters of a hybrid encoding scheme may be determined according to the present invention, such as those which are connected to encoding of prediction errors of the motion-compensated prediction and have an influence on distortion and compression rate. For example, this could be a parameter which adjust a transformation accuracy of a time-frequency transformation which takes place in the encoding just mentioned.

Accordingly, it is not necessarily needed that the encodings in step 1 or 2 be performed with a fixed encoding parameter. Rather, the complete encodings there performed could also be performed with orders of encoding parameter values in which the encoding parameter value varies from frame to frame and which are different to each other.

In the foregoing, in step 106, the encoding parameter, namely the quantization parameter, was varied with each frame during the complete encodings in step 102 so as to obtain D and R values for the other encoding parameters. The present invention, however, is also advantageous with a mode of operation in which, in step 102, complete encodings are performed with different supporting orders of encoding parameter values and, in step 106, D/R pairs for other orders of parameter values are established, which, however, only concern a first part of the frame sequence. Consequently, the mode of operation according to FIG. 1 could be changed so that, branching from the main paths or main branches, the variation of the encoding parameter for the next two frames is performed and the corresponding resulting D and R values are established. The return to the main branches would then be performed as described.

Further, in step 202, a state transition diagram was built in the foregoing, according to which the optimum set of encoding parameter values could be established by state transitions, based on an initial state. However, other representation possibilities are present too. It would possible to transfer the results of steps 202a and 202b into the tree structure representation of 202 by using the association results from step 202b to entry estimated data values into up to date still missing parts of the tree structure representation, so that a complete tree structure representation results subsequent to step 202.

With reference to step 204, it should further understood that the determination of the order of encoding parameter values may, of course, be performed by help of algorithms other than the Viterbi algorithm. The cost function, too, could be selected differently, and the optimization sum could be performed based on other aspects. Effectively, no optimization will have to be performed in step 204, if finding an encoding which is sufficient according to predetermined criteria is sufficient for a particular application.

Finally, it should be understood that step 30 could be omitted, as previously mentioned, so that the output of the method, or the corresponding device, would only consist in the output of the determined order of encoding parameter values.

In particular, it should be understood that depending on the circumstances, the inventive method may also be implemented in software, as has been described in the foregoing. Implementation may occur on a digital storage medium, in particular a disc or CD with electronically readable control signals which can interact with a programmable computer system such that the corresponding method is performed. Generally, the invention thus also consists in a computer program product with a program code, stored on a machine-readable carrier, for performing the inventive method, when the computer program product runs on a computer. In other words, the invention may thus be realized as a computer program having a program code for performing the method, when the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A device for determining a sequence of values for an encoding parameter of a hybrid encoding scheme, which includes for each frame of a frame sequence of N frames, a value which is selected from of a predetermined set of M predetermined values for the encoding parameter, for use for encoding the frame sequence by using the hybrid encoding scheme, the device comprising:
   a data establisher configured to establish, using the hybrid encoding scheme, distortions and compression rates for the frames of the frame sequence, by:
       completely encoding the frame sequence with different supporting sequences of values for the encoding parameter, out of $M^N$ possible sequences of values, and determining a distortion and a compression rate of the completely encoding per frame for each supporting sequence,
       encoding, for respective frames of the frame sequence from a second frame of the frame sequence up to the $N^{th}$ frame of the frame sequence, the frame sequence from a first frame of the frame sequence to one of the respective frames of the frame sequence with, for each supporting sequence, fragment sequences of values for the encoding parameter, which include, for each frame from the first frame to the one of the respective frames of the frame sequence, exclusively, the same values as a respective supporting sequence, respectively, but differ from the respective supporting sequence in a value of the encoding parameter for the one of the respective frames, and
       determining, for each fragment sequence, a distortion and a compression rate of the encoding per frame from the first frame of the frame sequence to the respective frame of the frame sequence;
   a data estimator configured to, for a predetermined frame of the frame sequence, establish, per fragment sequence which includes, for each frame from the first frame to the predetermined frame of the frame sequence, exclusively, the same values as a predetermined one of the supporting sequences, respectively, but differ from the predetermined supporting sequence in a value of the encoding parameter for the respective one of the frames, estimated distortions and compression rates for frames of the frame sequence which follow the predetermined frame, under association of a respective fragment sequence to the one of the supporting sequences for which a determined distortion of the predetermined frame includes a smallest difference to the distortion established using the respective fragment sequence; and
   a first determiner configured to determine the sequence of values for the encoding parameter of the hybrid encoding scheme, based on the distortions and compression rates as determined from the encodings performed by the data establisher, and the estimated distortions and compression rates as established by the data estimator; wherein at least one of the data establisher, the data estimator and the first determiner comprises a hardware implementation.

2. The device according to claim 1, in which the data establisher comprises:
   an encoder configured to encode, by using the hybrid encoding scheme, the frame sequence, and by using the different supporting orders sequences of values for the encoding parameter for each frame of the frame sequence to acquire a sequence of encoded frames for each supporting sequence;
   a second determiner configured to determine the distortion and the compression rate for each encoded frame of each sequence of encoded frames acquired for one of the supporting sequences, so that each supporting sequence is associated with the distortion and the compression rate of the encoded frames of the sequence of encoded frames which is acquired for the respective supporting sequence; and
   an establisher configured to, for each frame of the frame sequence from the second frame of the frame sequence to the $N^{th}$ frame of the frame sequence, encode, for each supporting sequence, the respective frame using values for the encoding parameter which differ from the respective supporting sequence for the respective one of the frames, and determine the distortion and the compression rate of the respective one of the encoded frames for each value of the encoding parameter.

3. The device according to claim 2, in which the data establisher comprises:
   a comparator configured to compare, for the predetermined supporting sequence, the distortion of the predetermined frame determined by the first determiner with the distortion of the predetermined frame determined by the second determiner, so as to acquire a comparison result; and
an associator configured to associate, based on the comparison result, the fragment sequence with one of the supporting sequences to obtain, for the encoding parameter, an estimated supporting sequence of values which is comprised of the fragment sequences complemented by part of the supporting sequence associated with the fragment sequence, which is associated with the frames after the predetermined frame of the frame sequence, and which is associated with the distortions and compression rates of the initial sequence which are established by the establisher and the determined distortions and encoding rates of encoded frames of the sequence of the encoded frames corresponding to the frames following the predetermined frame.

4. The device according to claim 3, in which the first determiner comprises:
a selector configured to select the sequence of values for the encoding parameter from a set including the supporting sequences and the estimated supporting sequence, depending on the respectively associated distortions and compression rates.

5. The device according to claim 4, in which the encoder is formed to perform the encoding of the frame sequence, using supporting sequences constantly comprising, for each frame, a different predetermined value from the predetermined set.

6. The device according to claim 4, in which the establisher is formed to establish the distortion and the compression rate of encoded frames of an initial sequence of encoded frames, as acquired by encoding the real partial sequence by means of the hybrid encoding scheme using a fragment sequence which differs from the subsequence of a predetermined supporting order relating from the first frame to the predetermined frame only by replacing the last value of this subsequence with another value from the predetermined set.

7. The device according to claim 6, in which the establisher is formed to use, when establishing the distortion and the compression rate of the last encoded frame of the initial sequence of encoded frames, an intermediate result, representing a residual to a motion-compensated prediction of the predetermined frame, of the encoding of the frame sequence by the encoder by means of the hybrid encoding scheme using the predetermined supporting sequence, so as to continue, by means of the hybrid encoding scheme, the encoding of the predetermined frame using the other value for the encoding parameter.

8. The device according to claim 6, in which the establisher, the comparator and the associator are formed to repeat the establishing, the comparison and the association for a plurality of the frames for a plurality of the predetermined supporting sequences.

9. The device according to claim 1, in which the data establisher is formed to perform establishing of resulting distortions and compression rates for the frames of the frame sequence for the case of the complete encoding of the frame sequence with such different supporting sequences which constantly comprise, for each frame, a different predetermined value from the predetermined set and for the case of the encoding of a real partial sequence of the frame sequence from the first frame which such fragment sequences which begin, for a respective supporting order j, with the first value of the supporting sequence j, which are identical, up to the (i−1)th value, with the supporting sequence j and which end, at a i-th value of the supporting sequence j, with another predetermined value for the encoding parameter, so as to acquire a state transition diagram comprising
an initial state, and
for each supporting order j of the supporting sequences,
for each possible suborder of the supporting sequence j beginning with the first value of the supporting sequence j and being identical, up to the i-th value, with the supporting sequence j as well as
for each fragment sequence beginning with the first value m of the supporting sequence j, being identical, up to the (i−1)th value, with the supporting sequence and ending, at a i-th value of the supporting sequence j, with another predetermined value k unequal to m for the encoding parameter,
states (j, i, m) and (j, i, k) and
comprising, between each pair of states (j, i, m) and (j, i+1, m), a state transition associated with the distortion and the compression rate of the (i+1)th frame in the encoding with the subsequence beginning with the first value of the supporting sequence j and being identical, up to the (i+1)th value, with the supporting sequence j, as well as m, and, between each pair of transitions (j, i, m) and (j, i+1, k), a state transition associated with the distortion and the compression rate of the (i+1)th frame in encoding with the fragment sequence beginning with the first value m of the supporting sequence j, being identical, up to the (i−1)th value, with the supporting sequence and ending, at an i-th value of the supporting sequence j, with another predetermined value k unequal to m for the encoding parameter, as well as k.

10. The device according to claim 9, in which the data estimator is formed to associate each state transition from (j, i, m) to (j, i+1, k) with that among the transitions (x, i+1, y) with a free-selectable x under the possible supporting sequences and the predetermined value y, such that it corresponds to the constant value of the supporting sequence x whose associated distortion comprises the smallest difference to the distortion of the state transition from (j, i, m) to (j, i+1, k), so that a state transition diagram is acquired, in turn per frame, with the initial state and a state per predetermined value of the predetermined set.

11. The device according to claim 1, in which the hybrid encoding scheme comprises an encoding pattern of IPPP . . . P.

12. The device according to claim 1, in which the encoding parameter defines a quantization parameter for use in a quantization of prediction error values in the hybrid encoding scheme.

13. The device according to claim 1, further comprising an encoder for encoding the frame sequence using the determined sequence of values for the encoding parameter by means of the hybrid encoding scheme.

14. A method for determining a sequence of values for an encoding parameter of a hybrid encoding scheme, which includes for each frame of a frame sequence of N frames, a value which is selected from a predetermined set of M predetermined values for the encoding parameter, for use for encoding the frame sequence by using the hybrid encoding scheme, the method comprising:
using the hybrid encoding scheme, establishing distortions and compression rates for the frames of the frame sequence, by:
completely encoding the frame sequence with different supporting sequences of values for the encoding parameter, out of $M^N$ possible sequences of values, and determining a distortion and a compression rate of the completely encoding per frame for each supporting sequence, encoding, for respective frames of the frame sequence from a second frame of the frame sequence up to the Nth frame of the frame sequence, the frame sequence, from a first frame of the frame sequence to one of the respective frames of the frame sequence, with for each supporting sequence, fragment sequences of values for the encoding parameter, which include, for each frame from the first frame to the one of the respective frames of the frame sequence, exclusively, the same values as a respective supporting sequence, respectively, but differ from the respective supporting sequence in a value of the encoding parameter for the one of the respective frames, and determining, for each fragment sequence, a distortion and a compression rate of the encoding per frame from the first frame of the frame sequence to the respective frame of the frame sequence;

establishing, for a predetermined frame of the frame sequence, per fragment sequence which includes, for each frame from the first frame to the predetermined frame of the frame sequence, exclusively, the same values as a predetermined one of the supporting sequences, respectively, but differ from the predetermined supporting sequence in a value of the encoding parameter for the respective one of the frames, estimated distortions and compression rates for frames of the frame sequence which follow the predetermined frame, associating a respective fragment sequence with the one of the supporting sequences for which a determined distortion of the predetermined frame includes a smallest difference to the distortion established using the respective fragment sequence; and based on the distortions and compression rates as determined by the encoding step and the estimated distortions and compression rates as established by the establishing step, determining the sequence of values for the encoding parameter of the hybrid encoding scheme.

15. A non-transitory computer readable medium storing a computer program, when run on a computer, the computer program performs a method for determining a sequence of values for an encoding parameter of a hybrid encoding scheme, which includes for each frame of a frame sequence of N frames, a value which is selected from a predetermined set of M predetermined values for the encoding parameter, for use for encoding the frame sequence by using the hybrid encoding scheme, the method comprising:

using the hybrid encoding scheme, establishing distortions and compression rates for the frames of the frame sequence, by:

completely encoding the frame sequence with different supporting sequences of values for the encoding parameter, out of $M^N$ possible sequences of values, and determining a distortion and a compression rate of the completely encoding per frame for each supporting sequence, encoding, for respective frames of the frame sequence from a second frame of the frame sequence up to the Nth frame of the frame sequence, the frame sequence from a first frame of the frame sequence to one of the respective frames of the frame sequence with, for each supporting sequence, fragment sequences of values for the encoding parameter, which include, for each frame from the first frame to the one of the respective frames of the frame sequence, exclusively, the same values as a respective supporting sequence, respectively, but differ from the respective supporting sequence in a value of the encoding parameter for the one of the respective frames, and determining, for each fragment sequence, a distortion and a compression rate of the encoding per frame from the first frame of the frame sequence to the respective frame of the frame sequence;

establishing, for a predetermined frame of the frame sequence, per fragment sequence which includes, for each frame from the first frame to the predetermined frame of the frame sequence, exclusively, the same values as a predetermined one of the supporting sequences, respectively, but differ from the predetermined supporting sequence in a value of the encoding parameter for the respective one of the frames, estimated distortions and compression rates for frames of the frame sequence which follow the predetermined frame, under association of a respective fragment sequence to the one of the supporting sequences for which a determined distortion of the predetermined frame includes a smallest difference to the distortion established using the respective fragment sequence; and based on the distortions and compression rates as determined by the encoding step and the estimated distortions and compression rates as established by the establishing step, determining the sequence of values for the encoding parameter of the hybrid encoding scheme.

* * * * *

UNITED STATES PATENT AND TRADEMARK OFFICE
CERTIFICATE OF CORRECTION

PATENT NO. : 8,462,845 B2  
APPLICATION NO. : 12/065532  
DATED : June 11, 2013  
INVENTOR(S) : Nikolaus Faerber et al.

Page 1 of 1

It is certified that error appears in the above-identified patent and that said Letters Patent is hereby corrected as shown below:

In the Claims

Please correct Claim 2, Column 16, line 42 to read as follows:

"…different supporting sequences…"

Signed and Sealed this  
Twenty-fifth Day of February, 2014

Michelle K. Lee  
*Deputy Director of the United States Patent and Trademark Office*

UNITED STATES PATENT AND TRADEMARK OFFICE
CERTIFICATE OF CORRECTION

PATENT NO.       : 8,462,845 B2
APPLICATION NO.  : 12/065532
DATED            : June 11, 2013
INVENTOR(S)      : Faerber et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1472 days.

Signed and Sealed this
Eighth Day of September, 2015

Michelle K. Lee
*Director of the United States Patent and Trademark Office*